July 18, 1961  P. LEMMERZ  2,992,857
RIVETLESS FASTENING BETWEEN RIM AND BODY OF A VEHICLE WHEEL
Filed Dec. 8, 1958  2 Sheets-Sheet 1
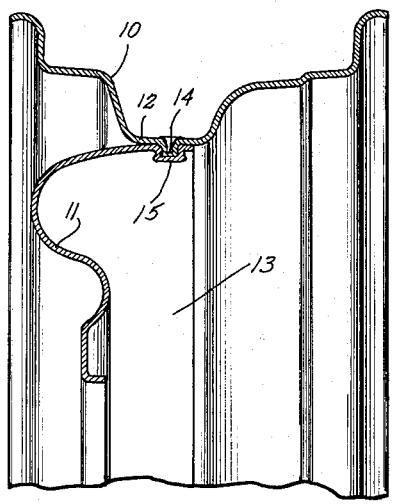
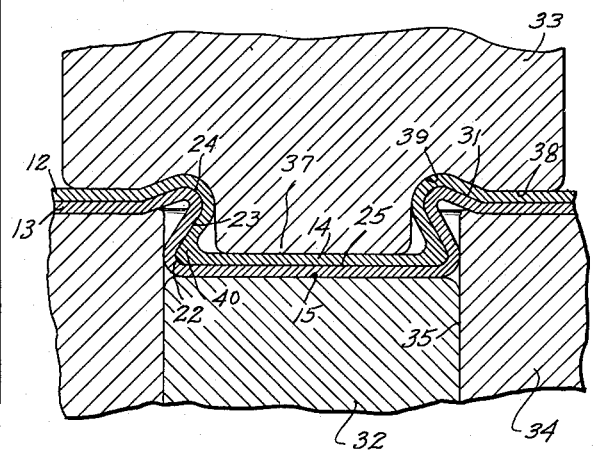
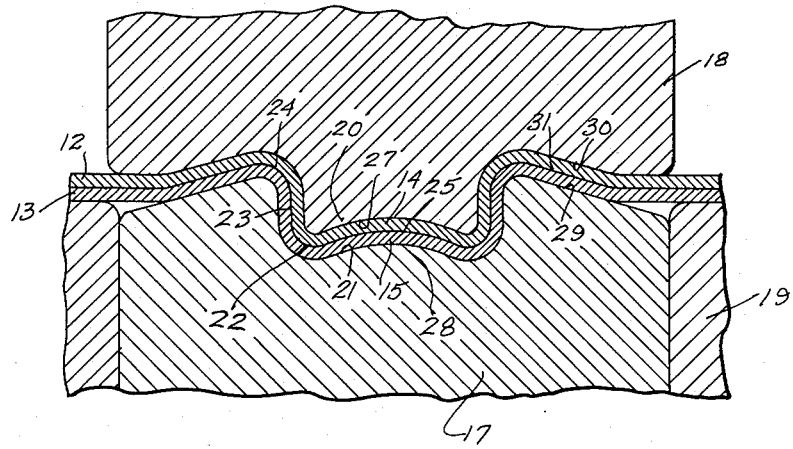
Inventor
Paul Lemmerz July 18, 1961 P. LEMMERZ 2,992,857
RIVETLESS FASTENING BETWEEN RIM AND BODY OF A VEHICLE WHEEL
Filed Dec. 8, 1958 2 Sheets-Sheet 2
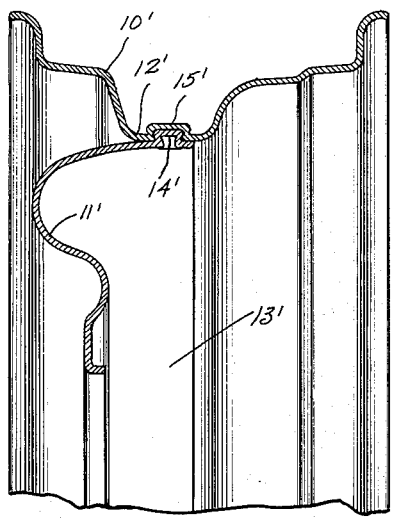
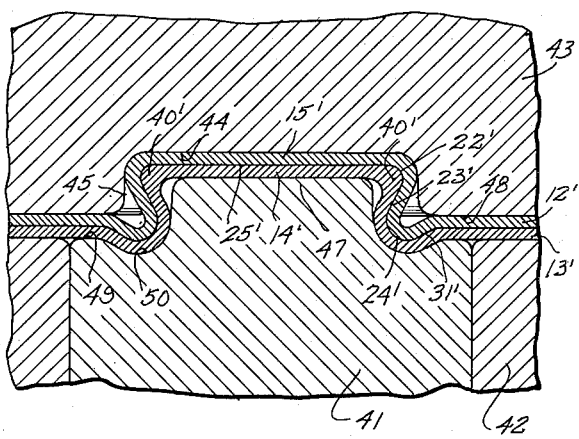
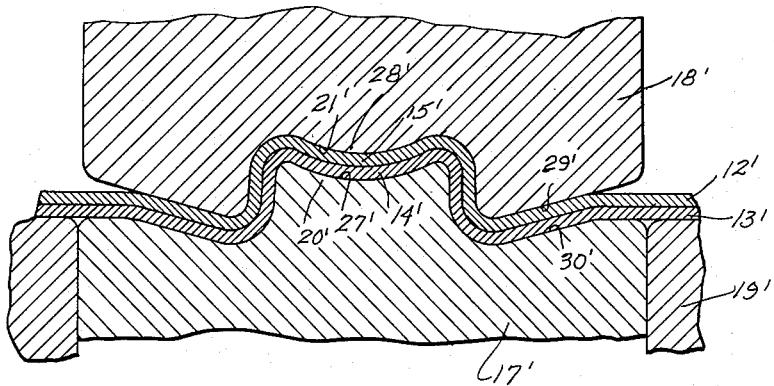
Inventor
Paul Lemmerz
by Kill, Sherman, Meroni, Gross & Simpson Attys.

2,992,857
RIVETLESS FASTENING BETWEEN RIM AND BODY OF A VEHICLE WHEEL
Paul Lemmerz, Konigswinter (Rhine), Germany, assignor to Lemmerz-Werke, G.m.b.H.
Filed Dec. 8, 1958, Ser. No. 778,798
Claims priority, application Germany Dec. 20, 1957
3 Claims. (Cl. 301—63)

The present invention relates to wheel structures and more particularly concerns the fastening together of the tire rim and the wheel body of a vehicle wheel.

While various attempts have heretofore been made to secure a metal tire rim to a disk spider wheel body of a vehicle wheel assembly without the use of rivets, no such prior securing expedients have provided structures capable of safely resisting the forces acting in axial or peripheral directions at high speeds and sudden braking forces or torques.

More especially, the prior techniques or expedients have been unsatisfactory for the employment of tubeless tires, due to the liability of air pervious cracks and thus leakage, since the tire rim provides the radially inner closure wall of the air chamber for a tubeless tire.

It is accordingly an important object of the present invention to provide a new and improved means for securing a vehicle tire rim to a disk spider wheel body wherein portions of the contiguous flanges of the rim and body are directly interengaged in a manner to withstand all service requirements with respect to torque and other forces tending to separate the members and which connection at the same time avoids any air permeability through the tire rim portions of the connections.

Another object of the invention is to provide an improved connection for securing a tire rim to a wheel body wherein portions of the members themselves are interlockingly pressed in the members.

A further object of the invention is to provide an improved method of securing a tire rim and wheel body of a vehicle wheel by the direct connecting of the components without use of rivets or welding.

Other objects, features and advantages of the present invention will be readily apparent from the following detailed description of certain preferred embodiments thereof taken in conjunction with the accompanying drawings in which:

FIGURE 1 is a fragmentary radial sectional detail view through a vehicle assembly comprising a tire rim and a wheel body secured together according to the present invention;

FIGURE 2 is an enlarged fragmentary sectional detail view through the base flange of the tire rim and the attachment flange of the wheel body of the wheel assembly showing the same in a preliminary stage of formation of one of the rivetless attaching structures, and the dies used in effecting this stage of fastening;

FIGURE 3 is a sectional view similar to FIGURE 2 but showing completion of the fastening structure and the dies utilized therefor;

FIGURE 4 is a radial sectional view through a vehicle wheel, similar to FIGURE 1 but showing a modification of the attaching structure;

FIGURE 5 is a fragmentary enlarged sectional view through the rim and body flanges of the wheel of FIGURE 4 showing the fastening structure in a preliminary stage of formation; and FIGURE 6 is a view similar to FIGURE 5 but showing the modified fastening structure at completion thereof in the dies provided for this purpose.

Referring to FIGURE 1, a multi-flanged, drop center metal tire rim 10 is carried by a pressed metal disk spider wheel body 11. A base flange 12 of the tire rim has as tightly or snugly as practicable telescopically fitted therein a peripheral generally axially extending attachment flange 13.

Permanent fastening of the tire rim and wheel body into a functionally integral unit is achieved according to the present invention by securing the tire rim base flange 12 and the wheel body attachment flange 13 together in a manner which will hold the components positively united and against coming apart under the most severe operating stresses to which the wheel may be put in service, and also without any danger of cracking or rupture of the material of the fastened flanges of the components so that the tire rim is efficiently adapted for use with tubeless tires for which the inner portions of the tire rim and especially the base flange 12 serve as part of the air chamber wall in conjunction with the tire casing. To this end, the material of one of the telescopically related component flanges 12, 13 is directly physically interlockingly pressed into engagement with the material of the companion flange. Thereby, at suitable circumferentially spaced intervals, in the form of FIGURE 1, integrally pressed button-like stud protuberances 14, in this instance on the base flange 12, engage in interlockingly internested relation within generally dished hollow pressed dovetail socket embossments 15 complementary thereto in the attachment flange 13. Certain structural features affording unusually effective retention and complete freedom from leakage in the complementary button stud and socket protrusion fastening device will be described in more detail in connection with FIGURES 2 and 3 disclosing a method of pressing and forming this structure.

In FIGURE 2 there is depicted the first step in the formation of the interlocking stud and socket structure which is accomplished after the tire rim and wheel body have been assembled by telescopically interfitting the attachment flange 13 into the base flange 12. This preliminary assembly is then acted upon by the punch and die means shown including a die member 17, a coactive punch 18 and an article support 19, all mounted in a suitable punch press. Initially the assembled wheel components are placed between the separated punch and die members 17 and 18 with the base flange 13 resting upon the supporting member 19 which is preferably resiliently yieldably mounted in the press as by means of suitable springs (not shown) normally to project above the die punch member 17 which may be mounted rigidly upon the bolster of the press. The press is then actuated to drive the ram thereof on which the punch 18 is mounted to drive the punch into forming engagement against the tire rim base flange 12.

During the forming stroke of the punch 18, an embossing nose 20 projecting from its lower end presses the flange assembly 12, 13 downwardly toward the punch die 17 as permitted by yielding of the support 19, and in the continuing punching stroke simultaneously draws the engaged limited areas of the base flange 12 and the contiguous lapped area of the attachment flange 13 into a die depression recess 21 in the opposing end face of the die punch 17. This forms the stud 14 and the socket boss 15 as internested generally cup-shaped indentations in the respective flanges.

Although the stud and socket embossments are drawn to substantial depth in the fairly heavy gauge material of the flanges 12 and 13, the lapped relationship of the material of the flanges provides mutual support and compensation substantially precluding any tendency toward rupture or cracking. Freedom from rupture is further assured by having all outside corners and coactive, complementary inside corners or grooves of the punch and die members contoured on appropriate radii so that all formed junctures between portions of the pressed or embossed areas themselves and between such areas and the flanges of which they are a part are appropriately rounded in cross-section and in complementary internested relation to maintain bending strains within entirely safe limits. Thus, at the inner end of the cup-shaped draw the stud and socket portions 14 and 15 are formed with internested rounded juncture 22 joining telescoped connecting wall sections 23 of the indentations with the main wall portions of the indentations offset from the plane of the lapping flanges 12 and 13 and of substantial circular or other shaped area. Substantial radius juncture 24 joins the connecting wall portions 23 with the body portions of the flanges 12 and 13.

In the final increment of forming stroke of the punch and die members 17 and 18, an arcuate massing of material 25 is effected in the main, offset central wall portion of the impressed cup-shaped stud and socket formation, the punch nose 20 being provided for this purpose with a shallow recess 27 toward which a complementary shallow forming node 28 in the bottom of the forming recess 21 of the die punch 17 projects to produce a corresponding generally outwardly projecting bottom wall shape in the nested indentations 14 and 15.

At the same time, in the final increment of the metal shaping stroke of the punch and die members 17 and 18, complementary forming surfaces 29 and 30 on respectively the end faces of the members 17 and 18 and sloping downwardly (as seen in FIGURE 2) away from the respective juncture radii at the mouth of the forming recess 21 and the base of the punch nose 20, and on a shallow pitch, coact to form correspondingly tapered area 31 in the lapped flanges 12 and 13 about the indented embossed area and sloping away from the radius juncture 24 in the direction of protrusion of the embossment.

In the second and final step in forming the interlocked stud and socket fastening structure, as depicted in FIGURE 3, the reversely or upwardly dished base wall portion 25 of the internested indentations is flattened out and thereby spread laterally and the curved juncture 24 is turned in toward and into overlying relation to the flattened spread out base wall 25. This is adapted to be effected by means of a lower flattening punch or anvil member 32 with which is coactive an upper forming punch 33, with a supporting member 34 providing a bore 35 within which the anvil punch 32 is reciprocably slidably mounted. On its lower forming face the punch 33 has a flat-tipped forming nose 37 which may be slightly larger in diameter than the diameter of the forming nose 20 of the punch 18 and during a punching stroke engages against the rounded juncture 24 on the incurving portion thereof and exerts expanding and inward pressure toward the connecting wall portion 23. Since the diameter of the bore 35 is larger to a predetermined extent than the outside diameter about the embossment wall 23, lateral expansion of the wall 23 is accommodated. As the flat tips of the punch members 32 and 37 come together they flatten out the base wall 25 therebetween, so that the base wall 25 assumes a larger diameter accommodated by further slight bending of the juncture 22 and expansion of the contiguous portion of the connecting wall 23. At the same time, an end face 38 on the punch 33 coacts with the opposing face of the support member 34 to flatten out a substantial portion of the sloping area 31, which causes a further working in and crowding of the material of the wall 23 toward and into the laterally expanded rounded juncture 22. Flattening out of the portion 31 extends to a point adjacent to the curved juncture 24 where a remnant of the sloping area 31 runs into the curved juncture 24 extending into a transversely curved forming groove 39 about the base of the punch nose 37 for maintaining the juncture 24 on a radius or rounded form free from liability to crack or fracture. As a result of the compressive, material displacing forces effected between the punches 32 and 33 and the supporting member 34 and the punch 33, the portions of the united flanges within the interlocked embossed indentations assume a dovetailed-like relationship defining respective complementary opposing generally radially facing interlocking shoulders. In addition, crowding of the material into the rounded juncture corners 22 and 24 as well as in the outwardly flared connecting wall portion 23, achieves an efficient cold work hardened reinforced relationship. It has been observed that a thickened reinforcing ring 40 of material develops in the dovetail terminus of the connecting wall portion of the stud protuberance 14 lodged firmly within the dovetail groove defined in the bottom of the side portions of the socket within the protrusion 15.

For some reasons it may be desirable to have the indented button stud and socket boss structure project from the radially outer side of the assembly, that is from the base flange of the tire rim as shown in FIGURE 4 rather than to project radially inwardly from the attachment flange 13 of the wheel body. This modified arrangement is especially appropriate where there is lack of clearance between the brake drum or projections thereon such as ribs and the radially inner side of the attachment flange of the wheel body. This modified form is also advantageous where the material of the tire rim in the base flange is thinner than the material of the wheel body in the attachment flange. Since the structure of the indented, embossed fastening is substantially the same but in reverse from that shown in FIGURES 1-3, identical primed reference numerals are applied in FIGURES 4-6 and it will be understood that the several details of structure are the same, with the exception of the reversal of the parts as described in connection with FIGURES 1-3. In this modified construction, of course, the base flange 12' of the tire rim 10' has the socket boss 15' while the attachment flange 13' of the wheel body 11' has the button stud 14'.

In the first drawing of the interlocking indentations 14' and 15' as shown in FIGURE 5, not only the components of the die structure, but also the functioning and metal drawing and forming coaction is substantially identical to the apparatus described in FIGURE 2, except that in this modified instance the punch 18' has the forming recess 21' and the punch member 17' has the forming nose 20', with all other forming surfaces correspondingly reversed.

In the final forming step as depicted in FIGURE 6, there is not only a reversal of forming surfaces as compared to FIGURE 3 but some other slight changes in the die structure arising from the desirability of having the upper member reciprocable relative to the lower of the forming punch members. To this end, a lower stationary punch member 41 is provided within a slidably relatively reciprocable preferably spring biased yieldable supporting member 42 upon which the flange assembly is engaged while the supporting member 42 is at an elevation above the forming surfaces of the punch 41 toward which the work is pressed by an upper forming punch 43 having therein a flat bottomed forming cavity or recess 44 with a vertical sizing wall 45 corresponding to the sizing wall defined by the bore 35 in FIGURE 3. A flat tipped forming nose 47 on the lower stationary punch member 41 functions to work the initially formed internested indentations in substantially the same way and to the same effect as the punch nose 37 in FIGURE 3. In this modification, the upper punch 43 has a flat face 48 about the forming recess or cavity 44 which coacts with the opposing face of the supporting member 42 and an upwardly facing flattening surface 49 on the punch member 41 about a transversely curved forming groove 50 to effect flattening of the major portion of the sloping section 31', with a minor portion of the sloping surface 31' and the curved juncture 24' being formingly accommodated in the forming groove 50 about the base of the punch nose 47. In the coaction of the punch and die components 41, 42 and 43 in a forming stroke, the end result is the same as accomplished in the apparatus of FIGURE 3, only in reverse, there being a firm, permanent dovetailed interlocking interengagement of the flared, button stud 14' within the undercut grooved dovetail socket provided by the embossed projection 15'.

In both forms of the invention, the fact that neither of the joined rim or wheel body flanges are punched through and in the displacement of material incident to forming the embossed interlocks complete freedom from cracking or rupture is maintained, high protection against permeability to air through the tire rim is afforded. This means that a wheel in which the tire rim and wheel body are fastened together according to the present invention is more suitable for tubeless tires than prior wheels.

Since the interlocked pressed together indentations are in such firm gripping relation at the sides and bottom of the projecting stud and socket boss and by virtue of the massing and hardening of the material in the working thereof, then all peripherally and axially acting forces arising in operation of the wheel during driving of the vehicle are resisted at even the highest speeds and the most severe braking actions without any danger of the attaching structure breaking loose.

It will be understood that modifications and variations may be effected without departing from the scope of the novel concepts of the present invention.

I claim as my invention:

1. In a vehicle wheel structure especially adapted for use with tubeless tires, a tire rim having a generally axially extending base flange and adapted to serve as a part of the air chamber in conjunction with a tubeless tire casing, a wheel body for supporting the tire rim and having a generally axially extending peripheral attachment flange in lappingly telescoped assembly with said base flange, one of said flanges having a hollow embossed protrusion defining a socket opening toward the other of said flanges, and an embossed projection on the other of said flanges tightly nested in said socket, said protrusion and said projection having lapped connecting wall portions in generally dove-tailed relation converging toward an opening from the socket and joining the respective flanges about said opening on a substantial radius juncture and slightly offset from the planes of the flanges in the opposite direction from the projection of the protrusion and projection relative to the flanges whereby to assure freedom from air leakage cracks, the opposite terminus of the connecting wall portions being joined on rounded crack-free juncture with lappingly related central wall portions serving strongly to resist drawing-in of the dove-tail terminus of the connecting wall portions whereby to maintain a positive connection of the flanges.

2. In a vehicle wheel structure especially adapted for use with tubeless tires, a tire rim having a generally axially extending base flange and adapted to serve as a part of the air chamber in conjunction with a tubeless tire casing, a wheel body for supporting the tire rim and having a generally axially extending peripheral attachment flange in lappingly telescoped assembly with said base flange, one of said flanges having a hollow embossed protrusion defining a socket opening toward the other of said flanges, and an embossed projection on the other of said flanges tightly nested in said socket, said protrusion and said projection having lapped connecting wall portions in generally dove-tailed relation converging toward an opening from the socket and joining the respective flanges about said opening on a substantial radius juncture and slightly offset from the planes of the flanges in the opposite direction from the projection of the protrusion and projection relative to the flanges whereby to assure freedom from air leakage cracks, the opposite terminus of the connecting wall portions being joined on rounded crack-free juncture with lappingly related central wall portions serving strongly to resist drawing-in of the dove-tail terminus of the connecting wall portions whereby to maintain a positive connection of the flanges, the juncture of the connecting wall portion and central wall portion of said projection comprising a hardened thickened reinforcing rib anchored in a groove defined by the connecting wall portion and central wall portion of said protrusion within the socket.

3. In a vehicle wheel structure especially adapted for use with a tubeless tire, a tire rim having a generally axially extending base flange and adapted to serve as part of the air chamber with a tubeless tire carried by the tire rim, a wheel body having a generally axially extending peripheral attachment flange in lapped engagement with said base flange, and embossed connection permanently securing said flanges together against all operating stresses and completely free from any air leakage cracks, said connection comprising a button-like stud of substantially dove-tail cross-sectional shape pressed in one of said flanges and a complementary dove-tail socket embossed in the other of said flanges and retainingly lappingly gripping said stud, juncture of the stud and socket embossment with the respective flanges being on respective rounded cross-section junctures directly with the respective flanges, said stud and socket embossment having central walls and dove-tail side walls all respectively lappingly interengaging and with juncture of the side walls and central walls being on rounded juncture, the socket embossment providing within the socket thereof at juncture of the central and side walls thereof a groove and the juncture of the side wall and central wall of the socket comprising a thickened hardened reinforcing rib thrusting retainingly into said socket.

References Cited in the file of this patent

UNITED STATES PATENTS

| | | |
|---|---|---|
| 1,688,146 | Klaus | Oct. 16, 1928 |
| 1,741,716 | Hunt | Dec. 31, 1929 |
| 2,122,557 | Canter | July 5, 1938 |
| 2,321,755 | Kost | June 15, 1943 |
| 2,713,197 | Schmidt | July 19, 1955 |
| 2,840,422 | Main | June 24, 1958 |
| 2,876,724 | Hillix | Mar. 10, 1959 |